J. F. O'CONNOR.
FRICTION SHOCK ABSORBING MECHANISM.
APPLICATION FILED MAR. 12, 1918.
1,290,325.
Patented Jan. 7, 1919.
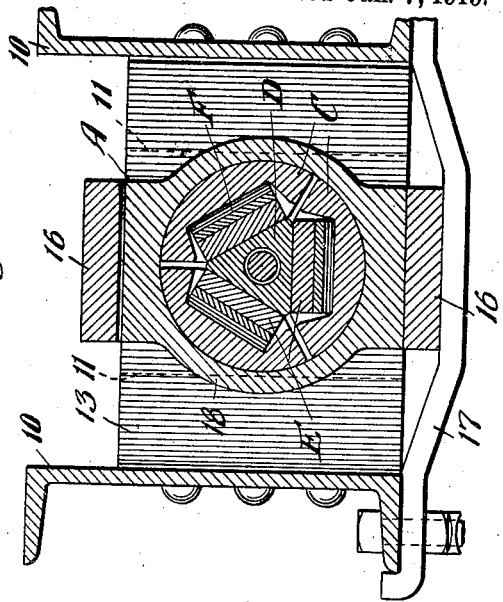
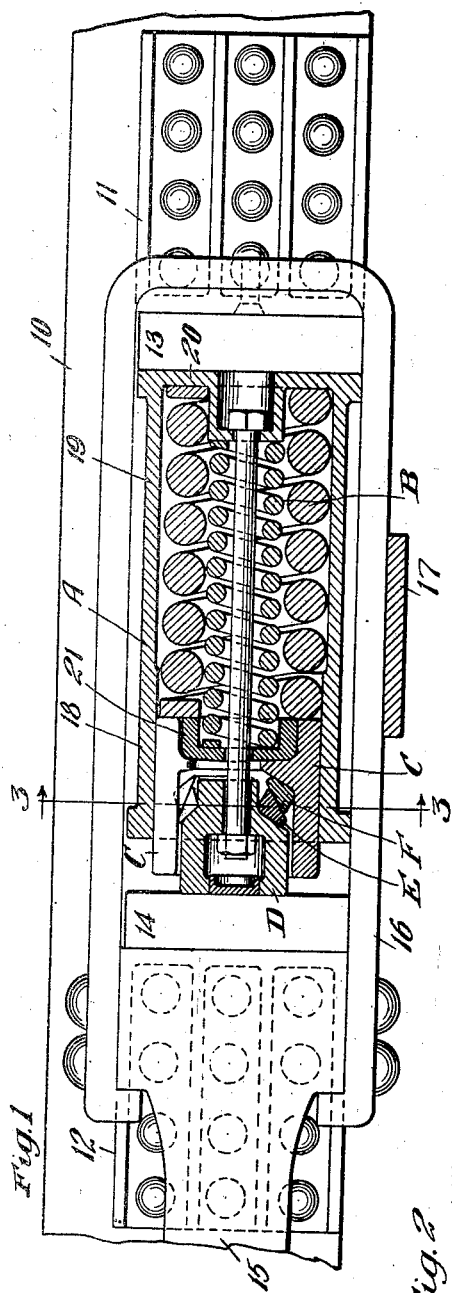
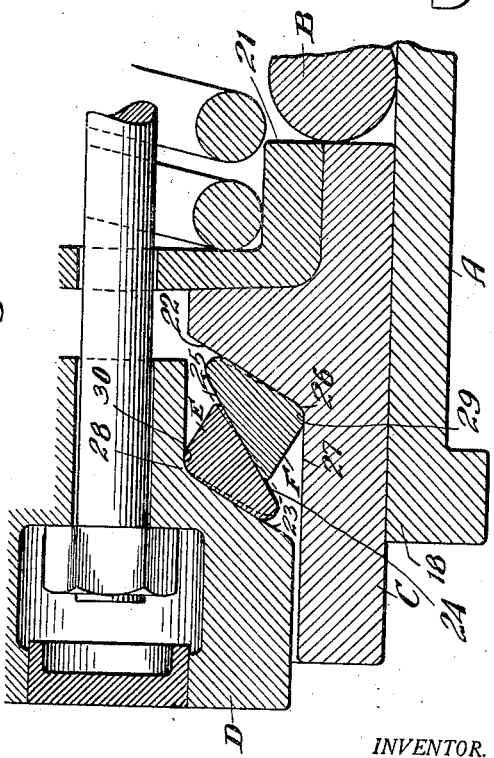
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,290,325.   Specification of Letters Patent.   Patented Jan. 7, 1919.

Application filed March 12, 1918. Serial No. 221,929.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism, more particularly adapted for railway friction draft riggings, which mechanism shall have high capacity and certain release.

More specifically, the object of the invention is to provide a friction shock absorbing mechanism employing a plurality of friction shoes and wedging means therefor, which wedging means are so designed that the wedging angle in compression is relatively keen or acute but automatically becomes relatively obtuse or blunt in release for the purpose of effecting high capacity in compression and a certain release.

In the drawing forming a part of this specification, Figure 1 is a longitudinal, vertical, sectional view of a portion of a railway draft rigging, showing my improvements in connection therewith. Fig. 2 is an enlarged, detail, sectional view of the cylinder end of the friction shock absorbing mechanism proper and illustrating more particularly the arrangement of wedging and friction elements. Fig. 3 is a transverse, vertical, sectional view, taken substantially on the line 3—3 of Fig. 1.

In said drawing, 10—10 denote channel-shaped center or draft sills of a railway car to the inner faces of which are secured rear stops 11 and front stops 12 for coöperation with rear follower 13 and front follower 14, respectively. The shock absorbing mechanism proper, hereinafter described, is confined between the followers 13 and 14 and operatively connected to the draw bar 15 by a yoke 16 in a well known manner, all of the parts being supported in proper position by a detachable saddle plate 17.

The improved shock absorbing mechanism includes a cylindrical casting A, main spring B, friction shoes C, main wedge D, and auxiliary wedges E and F.

The casting A is of substantially cylindrical formation having a friction shell 18 at its forward or open end, a spring casing 19 rearwardly of the shell 18 and a rear wall 20. As will be understood, the spring B which, as shown, consists of two nested coils, is confined within the casing 19 and bears at its rear end against the wall 20. At its forward end, the spring B bears against the inner ends of the series of friction shoes C and washer 21, which is mounted within the shoes.

In the construction shown, there are three friction shoes C arranged circularly within the annular friction shell 18 in a well known manner. Each friction shoe C is provided on its inner face with an inwardly extending wedging surface 22 which, as clearly shown, extends at a relatively blunt or obtuse angle to the axis of the shock absorbing mechanism. The main wedge D is provided with a series of corresponding wedge faces 23, one for each of the friction shoes with which it coöperates, each of said wedge faces 23 being made substantially parallel with the wedge faces 22.

Interposed between each friction shoe C and the main wedge D is a pair of the auxiliary wedges E and F. As clearly shown in Fig. 2, each of the auxiliary wedges E and F is substantially of right-angle triangular form in cross section, the members of each pair being oppositely arranged. This brings the wedging face or surface 24 of the block E in engagement with the wedging surface or face 25 of the block F, and it will be noted that these wedging faces 24 and 25 extend at a much more acute or keen angle with respect to the axis of the gear than do the wedging faces 22 and 23 heretofore referred to. This angle in actual practice may remain about 30°.

Each of the shoes C is provided with a rounded bearing or seat 26 at the angle formed between the wedging face 22 and the longitudinally extending face 27, and the main wedge D is provided with a corresponding series of rounded bearings 28. The auxiliary wedges E and F are rounded along their edges, as indicated at 29 and 30, where said edges bear against the corresponding seats 26 and 28. With this arrangement, I am enabled to employ the auxiliary wedge members E and F as a toggle element in the release action. In other words, after the mechanism has been compressed and the pressure is removed from the main wedge D, the latter in moving outwardly with respect to the friction shell, will because of its engagement with the wedge blocks E at the bearings 28 and 30, cause the latter to oscillate slightly within said bearings 28 and produce a simultaneous similar action with respect to the blocks F and the shoes C. This action is illustrated by the dotted line position of the members E and F shown in Fig. 2, although it will be understood that the position shown by the dotted lines is somewhat exaggerated to more clearly illustrate the action.

From the preceding, it will be seen that during the compressive action of the mechanism, the angle at which the pressure applied to the main wedge D is transmitted to the friction shoes is dependent upon the angle of engaging wedge faces 24 and 25 since the effective pressure is transmitted from the main wedge D to the shoes in lines perpendicular to said faces 24 and 25. By maintaining these faces at a comparatively acute angle to the axis of the gear, the desirable heavy frictional capacity in compression is thereby obtained. In the release, the angle of the wedging faces 22 and 23 with the axis of the gear being extremely blunt or obtuse, substantially no frictional resistance is interposed to the rocking of the blocks E and F in the toggle manner heretofore described, so that the friction which may have been produced between the engaging surfaces 24 and 25 of the blocks E and F is immediately neutralized and the pressure between the main wedge and the shoes so decreased that the release of the parts under the expansion of the main spring B will readily take place. In actual practice, the main wedge D will preferably be made of malleable iron and the wedge elements E and F of steel.

I claim:

1. In a friction shock absorbing mechanism, the combination with a friction shell, a spring resistance, and friction shoes having wedge faces; of a pressure-transmitting member; and a set of wedge elements between said member and each wedge face of a friction shoe, each set of wedges having opposed wedging faces extending at a relatively acuate angle to the axis of said shell, one of said wedges of each set having also a wedge face coöperable with the wedge face of the corresponding friction shoe and extending at a relatively blunt angle to the axis of said shell.

2. In a friction shock absorbing mechanism, the combination with a friction shell, a spring resistance, and friction shoes having wedge faces; of a pressure-transmitting member; and a set of wedges between said member and the wedge face of each shoe, each set of wedges having opposed engaging wedging faces extending at an acute angle to the axis of the shell, the wedges of each set having rockable engagement respectively with the corresponding friction shoe and pressure-transmitting member.

3. In a friction shock absorbing mechanism, the combination with a friction shell, a spring resistance, and friction shoes having wedge faces; of a pressure-transmitting member having a series of wedge faces opposite the said wedge faces of the friction shoes and substantially parallel thereto; and a set of wedges interposed between said member and each friction shoe, said wedges having opposed wedging faces normally extending at an acute angle to the axis of the shell, said wedges having also other wedge faces coöperable with the said wedge faces of the friction shoes and member.

4. In a friction shock absorbing mechanism, the combination with a friction shell, a spring resistance, and friction shoes having wedge faces; of a main wedge member having a series of wedge faces arranged opposite the said wedge faces of the friction shoes and substantially parallel thereto, said wedge faces extending at a relatively blunt angle to the axis of the shell; and a set of toggle-acting wedges interposed between each friction shoe and said main wedge, said toggle-acting set of wedges being provided with oppositely arranged rockable bearings on the main wedge and friction shoe and being provided with opposed wedging faces extending at a relatively acute angle to the axis of the shell.

5. In a friction shock absorbing mechanism, the combination with a friction shell, a spring resistance, and friction shoes having wedge faces; of a main wedge member having a series of wedge faces arranged opposite the said wedge faces of the friction shoes and substantially parallel thereto, said wedge faces extending at a relatively blunt angle to the axis of the shell; and a set of toggle-acting wedges interposed between each friction shoe and said main wedge, said toggle-acting set of wedges being provided with oppositely arranged rockable bearings on the main wedge and friction shoe and being provided with opposed wedging faces extending at a relatively acute angle to the axis of the shell, said last named wedge faces being in sliding contact.

In witness that I claim the foregoing I have hereunto subscribed my name this 26th day of Feb., 1918.

JOHN F. O'CONNOR.